(12) United States Patent
Yasunaga

(10) Patent No.: US 11,179,974 B2
(45) Date of Patent: Nov. 23, 2021

(54) PNEUMATIC TIRE

(71) Applicant: Toyo Tire & Rubber Co., Ltd., Itami (JP)

(72) Inventor: Toshikazu Yasunaga, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 238 days.

(21) Appl. No.: 16/210,246

(22) Filed: Dec. 5, 2018

(65) Prior Publication Data
US 2019/0176537 A1 Jun. 13, 2019

(30) Foreign Application Priority Data
Dec. 13, 2017 (JP) .............................. JP2017-238851

(51) Int. Cl.
*B60C 11/03* (2006.01)
*B60C 11/13* (2006.01)
*B60C 11/12* (2006.01)

(52) U.S. Cl.
CPC ...... *B60C 11/1307* (2013.01); *B60C 11/0302* (2013.01); *B60C 11/032* (2013.01); *B60C 11/0309* (2013.01); *B60C 11/1204* (2013.01); *B60C 11/1236* (2013.01); *B60C 11/1281* (2013.01); *B60C 2011/0346* (2013.01); *B60C 2011/0358* (2013.01); *B60C 2011/0381* (2013.01); *B60C 2011/0383* (2013.01); *B60C 2011/0388* (2013.01); *B60C 2011/1213* (2013.01); *B60C 2011/1245* (2013.01); *B60C 2011/1254* (2013.01); *B60C 2011/133* (2013.01); *B60C 2200/04* (2013.01); *B60C 2200/14* (2013.01)

(58) Field of Classification Search
CPC ............. B60C 11/0302; B60C 11/1307; B60C 11/0309; B60C 2011/133; B60C 2011/1338
See application file for complete search history.

(56) References Cited

U.S. PATENT DOCUMENTS

2014/0130949 A1* 5/2014 Maehara ............. B60C 11/0302
152/209.8

FOREIGN PATENT DOCUMENTS

| CN | 104275987 A | 1/2015 |
|---|---|---|
| DE | 10 2008 009 325 A1 | 8/2009 |
| DE | 10 2015 210 044 A1 | 12/2016 |

(Continued)

OTHER PUBLICATIONS

Machine translation for Japan 2006-027567 (Year: 2020).*
(Continued)

*Primary Examiner* — Steven D Maki
(74) *Attorney, Agent, or Firm* — Westerman, Hattori, Daniels & Adrian, LLP

(57) ABSTRACT

A pneumatic tire includes blocks (36 and 41) formed by main grooves (10 and 15) extending in a circumferential direction of the tire and lateral grooves (20 and 25) extending in a tire width direction, and notches (50, 60, and 70) in stepped side end portions of the blocks (36 and 41). The lateral grooves (20 and 25) extend obliquely such that a tire grounding end (E) side is grounded later. Portions adjacent to the notches (50, 60, and 70) on the tire grounding end (E) side of the notches (50, 60, and 70) are protrusions (51, 61, and 71) protruding while forming an acute angle toward a tire equator (C) side.

6 Claims, 5 Drawing Sheets

(56) References Cited

FOREIGN PATENT DOCUMENTS

| | | | |
|---|---|---|---|
| EP | 1412 205 B1 | | 3/2006 |
| JP | 2000-038010 A | * | 2/2000 |
| JP | 2001-354011 A | | 12/2001 |
| JP | 2002-36820 A | | 2/2002 |
| JP | 2004-136819 A | * | 5/2004 |
| JP | 2004-276861 A | | 10/2004 |
| JP | 2005-14644 A | | 1/2005 |
| JP | 2006-027567 A | * | 2/2006 |

OTHER PUBLICATIONS

Machine translation for Japan 2004-136819 (Year: 2020).*
Machine translation for Japan 2000-038010 (Year: 2020).*
Office Action dated Jul. 1, 2020, issued in counterpart CN Appliaction No. 201811373768.8, with abridged machine English translation (9 pages).
Office Action dated Jan. 29, 2021, issued in counterpart DE Application No. 10 2018 221 502.2, with English translation (17 pages).
Office Action dated Aug. 31, 2021, issued in counterpart JP application No. 2017-238851, with English translation. (5 pages).

* cited by examiner

PNEUMATIC TIRE

CROSS-REFERENCE TO RELATED APPLICATIONS

This application is based on Japanese Patent Application No. 2017-238851 (filed on Dec. 13, 2017) and claims priority from Japanese Patent Application No. 2017-238851. The present disclosure incorporates entire contents of Japanese Patent Application No. 2017-238851.

TECHNICAL FIELD

The present disclosure relates to a pneumatic tire.

BACKGROUND ART

As disclosed in Patent Document 1, it has been proposed to make the end portions of the tread blocks of a pneumatic tire. In such a pneumatic tire, since the end portions of the blocks having a zigzag shape exerts an edge effect, the pneumatic tire has an excellent performance on the snow.

However, in the related art, a fine design of the zigzag shape of the end portions of the blocks has not been made in a state where a specific action of the tread and snow is considered.

Further, as disclosed in Patent Document 2, it has been proposed to make the end portions of the blocks (that is, a groove wall of a lateral groove) in a zigzag shape through which water flows to an outer side in a tire width direction in order to improve a drainage performance. Specifically, in Patent Document 2, it has been proposed that a plurality of small triangular notches are formed in an end portion of a block, and two adjacent notches form an acute angle heading toward the outer side in the tire width direction.

The configuration of Patent Document 2 may have a good drainage performance, but, the snow that entered the lateral groove may be discharged to the outer side in the tire width direction and the snow does not bite into the end portion of the block, so the performance on the snow may not always be good.

Patent Document 1: JP-A-2005-014644
Patent Document 2: JP-A-2002-036820

DISCLOSURE OF THE INVENTION

Problem that the Invention is to Solve

The present disclosure is to provide a pneumatic tire more suitable for traveling on snow.

Means for Solving the Problem

A pneumatic tire of an embodiment includes blocks formed by main grooves extending in a circumferential direction of the tire and lateral grooves extending in a tire width direction, and notches in step-in side end portions of the blocks. The lateral grooves adjacent to the notches extend obliquely such that a tire grounding end side is grounded later. Portions adjacent to the notches on the tire grounding end side of the notches are protrusions protruding while forming an acute angle toward a tire equator side. acute angle toward a tire equator side.

Advantage of the Invention

The pneumatic tire of the embodiment is more suitable for traveling on snow because of the above characteristics.

BEST MODE FOR CARRYING OUT THE INVENTION

Figure 1:
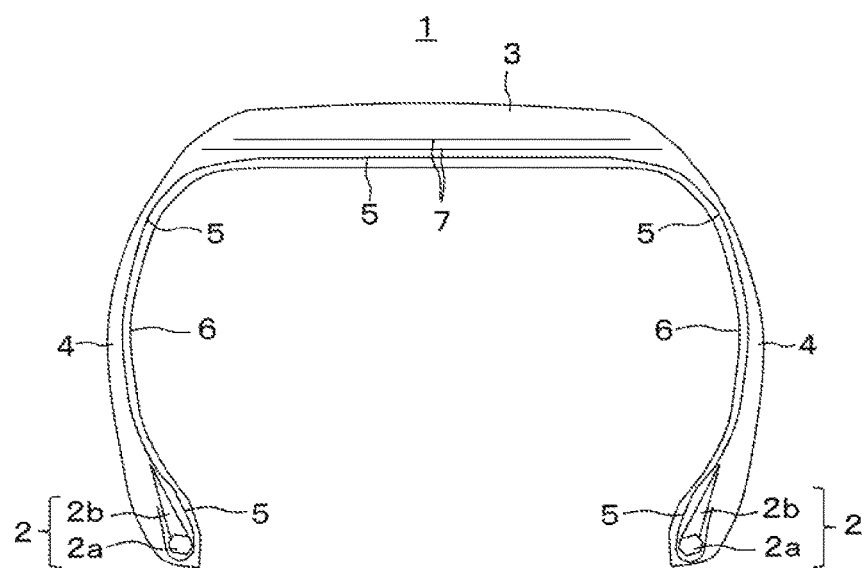
FIG. 1 A cross-sectional view in the width direction of a pneumatic tire of an embodiment.

As illustrated in FIG. 1, a bead portion 2 is provided on both sides in a tire width direction of a pneumatic tire 1. The bead portion 2 is constituted by a bead core 2a made of a steel wire wound in a circular shape and a bead filler 2b made of rubber and provided on a radial outer side of the bead core 2a. A carcass ply 5 is laid across the bead portion 2 on both sides of the tire width direction. The carcass ply 5 is a sheet type member in which a plurality of ply cords arranged in a direction orthogonal to a circumferential direction of the tire are covered with rubber. The carcass ply 5 forms a frame shape of the pneumatic tire 1 between the bead portions 2 on both sides of the tire width direction, and surrounds the bead portions 2 by folding back from inside to outside in the tire width direction around the bead portions 2. A sheet type inner liner 6 made of rubber having low air permeability is adhered to the inside of the carcass ply 5.

One or a plurality of belts 7 are provided on the tire radial outer side of the carcass ply 5. The belt 7 is a member made by covering a plurality of steel-based cords with rubber. A tread rubber 3 having a grounding surface with a road surface (hereinafter, referred to as a "grounding surface") is provided on the tire radial outer side of the belt 7. Further, a side wall rubber 4 is provided on both sides of the tire width direction of the carcass ply 5. In addition to these members, according to functional requirements of the pneumatic tire 1, members, for example, a belt lower pad or a chafer are provided.

Figure 2:
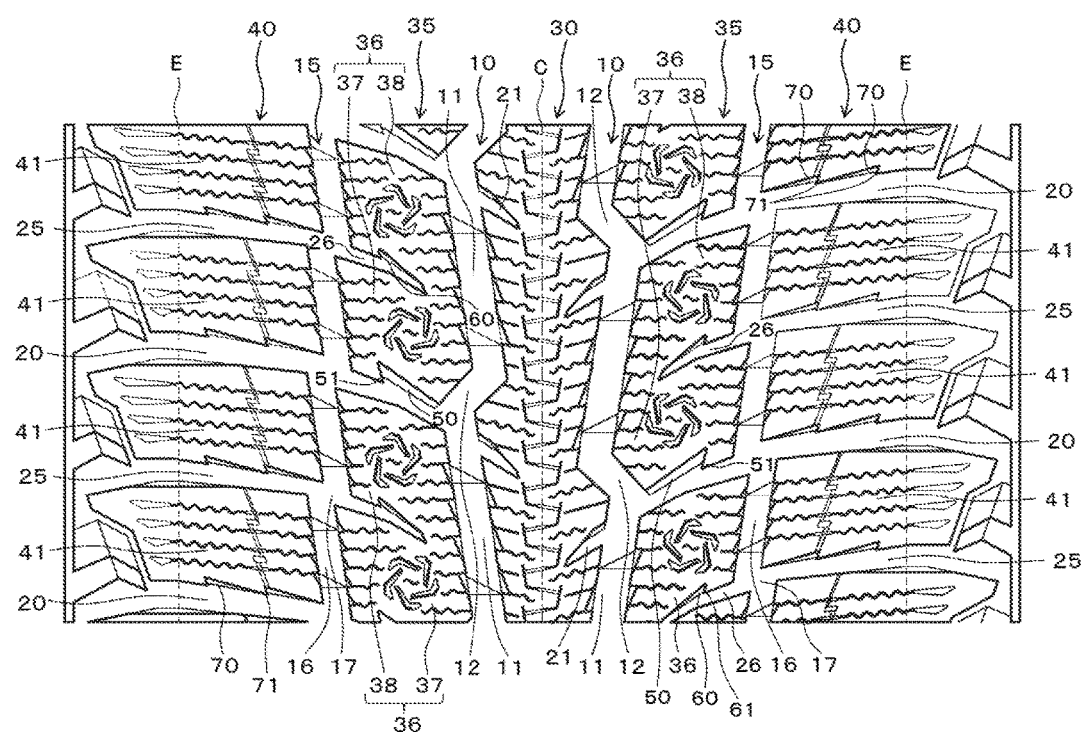
FIG. 2 A tread pattern of the pneumatic tire of the embodiment.

A tread pattern illustrated in FIG. 2 is formed on a surface of the tread rubber 3. In FIG. 2, the vertical direction is the circumferential direction of the tire, and the lateral direction is the tire width direction. In this tread pattern, as a main groove that extends in the circumferential direction of the tire and has a wide width, a total of four main grooves, that is, two center main grooves 10 on a tire equator C side (that is, an inner side of the tire width direction) and two shoulder main grooves 15 on a tire grounding end E side (that is, an outer side of the tire width direction) are formed. Then, a center land portion 30 between the two center main grooves 10, a mediate land portion 35 between the center main groove 10 and the shoulder main groove 15, and a shoulder land portion 40 between the shoulder main groove 15 and the tire grounding end E are provided.

Here, the land portion is a portion formed by being partitioned by grooves. Further, the tire grounding end E is an end portion of the grounding surface in the tire width direction in a loaded state. The loaded state is a state where the pneumatic tire is rim-assembled into a normal rim to be a normal inner pressure and loaded by a normal load. Here, the normal rim is a standard rim defined by standards such as JATMA, TRA, and ETRTO. Further, the normal load is a maximum load defined in the above standards. Further, the normal inner pressure is an inner pressure corresponding to the maximum load.

The center main groove 10 includes long first groove portions 11 that extend obliquely with respect to the circumferential direction of the tire, and short second groove portions 12 that are inclined with respect to the circumferential direction of the tire and extend in a direction different from that of the first groove portion 11. Then, a first groove portion 11 and a second groove portion 12 are arranged alternately, and thus, the center main groove 10 is formed in a zigzag shape. In FIG. 2, a lower side is grounded first during rolling of the tire (that is, when the vehicle is traveling). As can be seen from the drawing, the first groove portion 11 is inclined such that a portion to be grounded (in other words, a rear side in the rolling direction) later heads toward the tire grounding end E side.

The shoulder main groove 15 includes long first groove portions 16 that extend obliquely with respect to the circumferential direction of the tire, and short second groove portions 17 that are inclined with respect to the circumferential direction of the tire and extend in a direction different from that of the first groove portion 16. Then, the first groove portions 16 and second groove portions 17 are arranged alternately, and thus, the shoulder main groove 15 has a zigzag shape. As can be seen from FIG. 2, each of the first groove portions 16 is inclined such that a portion to be grounded later heads toward the tire grounding end E side.

Further, as lateral grooves that extend in the tire width direction, first lateral grooves 20 and second lateral grooves 25 are formed. The first lateral grooves 20 and second lateral grooves 25 are alternately formed in the circumferential direction of the tire. Each of the first lateral grooves 20 and each of the second lateral grooves 25 extend obliquely such that the tire grounding end E side is grounded later.

The first lateral groove 20 traverses the shoulder land portion 40 and the mediate land portion 35, and extends to the center land portion 30 and is closed in the center land portion 30. Therefore, a notch 21 that is a part of the first lateral grooves 20 is formed in the center land portion 30.

Further, the second lateral groove 25 traverses the shoulder land portion 40, and extends to the mediate land portion 35 and is closed in the mediate land portion 35. Therefore, a notch 26 that is a part of the second lateral grooves 25 is formed in the mediate land portion 35.

The second groove portion 17 of the shoulder main groove 15 overlaps with the first lateral groove 20 and the second lateral groove 25.

With the configuration of the groove as described above, the center land portion 30 between the two center main grooves 10 is a rib extending in the circumferential direction of the tire without being divided by lateral grooves. Further, the mediate land portion 35 is divided by the first lateral groove 20, and thus, is a row of a plurality of mediate blocks 36 arranged in the circumferential direction of the tire. In the mediate block 36, a portion to be grounded prior to the notch 26 is referred to as a "step-in side block portion 37," and a portion to be grounded later than the notch 26 is referred to as a "kick-out side block portion 38." Each of the step-in side block portions 37 and the kick-out side block portions 38 may be regarded substantially as a block. Further, the shoulder land portion 40 is divided by the first lateral groove 20 and the second lateral groove 25, and thus, is a row of a plurality of shoulder blocks 41 arranged in the circumferential direction of the tire.

Figure 4:
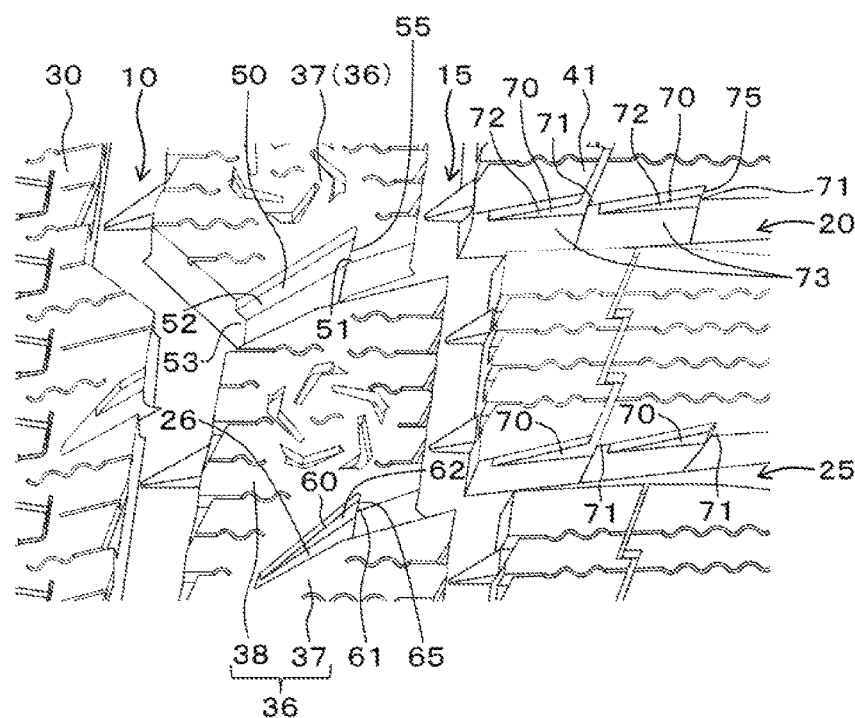
FIG. 4 A perspective view of the vicinity of a portion illustrated in FIG. 3.

As illustrated in FIGS. 2 and 4, a notch 50 is formed on the step-in side end portion (that is, one of the both end portions in the circumferential direction of the tire to be grounded first) of the mediate block 36. A portion adjacent to the notch 50 on the tire grounding end E side of the notch 50 is a protrusion 51 protruding while forming an acute angle toward the tire equator C side. Whether the angle is an acute angle or an obtuse angle is determined by looking at the tread pattern from a direction perpendicular to the tire grounding surface. Here, as illustrated in FIG. 4, a boundary 55 between the notch 50 and the protrusion 51 is inclined such that a portion to be grounded later heads toward the tire grounding end E side.

Figure 3:
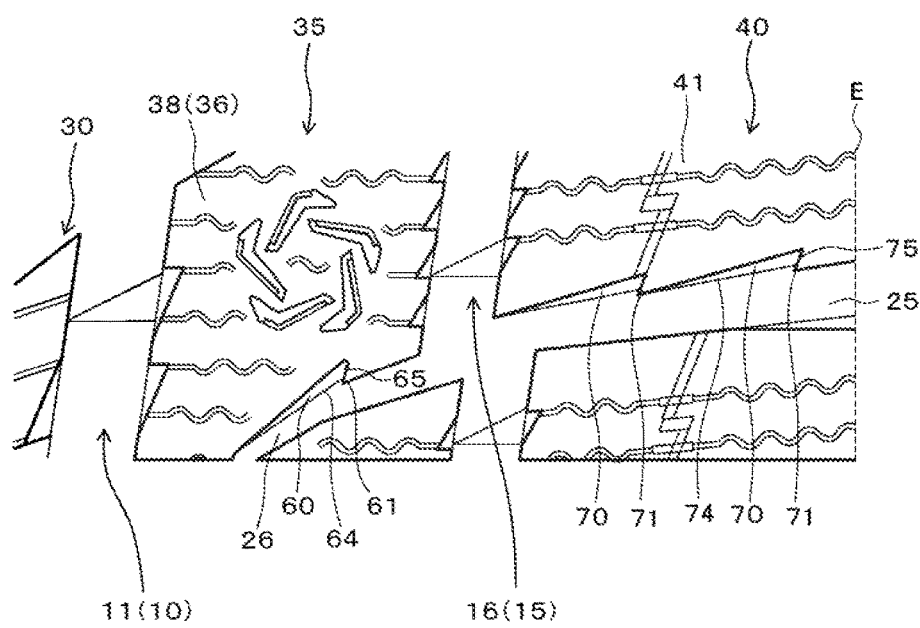
FIG. 3 An enlarged view of a mediate block and a shoulder block of the tread pattern of FIG. 2.

As illustrated in FIG. 4, a bottom surface 52 of the notch 50 is an upper surface of a shelf portion 53 higher than a bottom portion of the first lateral groove 20. Therefore, the notch 50 is shallower than the first lateral groove 20. A depth of the notch 50 (that is, a depth from the grounding surface to the bottom surface 52) may be 50% or less of the depth of the first lateral groove 20. As illustrated in FIG. 3, a tip of the protrusion 51 protrudes in the first lateral groove 20.

Further, as illustrated in FIGS. 2 to 4, a notch 60 is formed on the step-in side end portion of the kick-out side block portion 38 of the mediate block 36. The notch 60 is a triangle in a plan view (that is, as viewed from the tire outer radial side). When the triangle takes a boundary 64 with the notch 26 (see, e.g., FIG. 3) as a bottom side, a bottom angle on the tire grounding end E side (the right side in FIG. 3) is an obtuse angle, and a bottom angle on the tire equator C side (the left side in FIG. 3) is an acute angle.

Since the notch 60 has such a shape, a portion adjacent to the notch 60 on the tire grounding end E side of the notch 60 is a protrusion 61 protruding while forming an acute angle toward the tire equator C side. Here, a boundary 65 between the notch 60 and the protrusion 61 is inclined such that a portion to be grounded later heads toward the tire grounding end E side.

As illustrated in FIG. 4, a bottom surface 62 of the notch 60 is an upper surface of a shelf portion higher than a bottom portion of the notch 26. Therefore, the notch 60 is shallower than the notch 26. A depth of the notch 60 (that is, a depth from the grounding surface to the bottom surface 62) may be 50% or less of the depth of the notch 26. As illustrated in FIG. 3, a tip of the protrusion 61 protrudes in the notch 26.

Further, as illustrated in FIGS. 2 to 4, a notch 70 is formed on the step-in side end portion of the shoulder block 41. In the case of FIGS. 2 to 4, two notches 70 are formed in one shoulder block 41. The notch 70 is a triangle in a plan view (that is, as viewed from the tire outer radial side). When the triangle takes a boundary 74 with the first lateral groove 20 or the second lateral groove 25 (see, e.g., FIG. 3) as a bottom side, a bottom angle on the tire grounding end E side (the right side in FIG. 3) is an obtuse angle, and a bottom angle on the tire equator C side (the left side in FIG. 3) is an acute angle.

Since the notch 70 has such a shape, a portion adjacent to the notch 70 on the tire grounding end E side of the notch 70 is a protrusion 71 protruding while forming an acute angle toward the tire equator C side. Here, a boundary 75 between the notch 70 and the protrusion 71 is inclined such that a portion to be grounded later heads toward the tire grounding end E side.

As illustrated in FIG. 4, a bottom surface 72 of the notch 70 is an upper surface of a shelf portion 73 higher than a bottom portion of the lateral groove (the first lateral groove 20 or the second lateral groove 25) adjacent to the notch 70. Therefore, the notch 70 is shallower than the adjacent lateral groove. A depth of the notch 70 (that is, a depth from the grounding surface to the bottom surface 72) may be 50% or less of the depth of the adjacent lateral groove. As illustrated in FIG. 3, a tip of the protrusion 71 protrudes in the adjacent lateral groove.

As shown in FIGS. 2-4, tips of the protrusions protrude into the lateral grooves beyond the tire grounding end side of the notches.

As described above, the notches 50, 60, and 70 are formed on the step-in side end portions of the step-in side block portion 37 and the kick-out side block portion 38 of the mediate block 36, and the shoulder block 41. The portions adjacent to the notches 50, 60, and 70 on the tire grounding end E side of the notches 50, 60, and 70 are the protrusions 51, 61, and 71 protruding while forming an acute angle toward the tire equator C side. Therefore, when the pneumatic tire 1 is rotating on snow, at the step-in side of each block, the protrusions 51, 61, and 71 bite into the snow, thereby the traction performance is improved. Therefore, the pneumatic tire 1 is suitable for traveling on snow.

Here, since the first lateral groove 20 and the second lateral groove 25 adjacent to the notches 50, 60, and 70 are obliquely extend such that the tire grounding end E side is grounded later, the tip of the each notches 51, 61, and 71 protruding toward the tire equator C side becomes sharper. Therefore, the protrusions 51, 61, and 71 bite into snow deeper, so that the traction performance is improved.

Therefore, since the tips of the protrusions 51, 61, and 71 protrude in the adjacent lateral grooves, the protrusions 51, 61, and 71 bite into snow deeper, so that the traction performance is improved.

Further, since the bottom surfaces of the notches 50, 60, and 70 are higher than the bottom portions of the adjacent lateral grooves, the rigidity of the protrusions 51, 61, and 71 are secured. When the depth of the notches 50, 60, and 70 is 50% or less of the depth of the adjacent lateral grooves, the rigidity of the protrusions 51, 61, and 71 is sufficiently secured.

The above embodiments are examples, and the scope of the present disclosure is not limited thereto. Various modifications may be made to the above embodiments within the scope without escaping from the purpose of the present disclosure.

Figure 5:
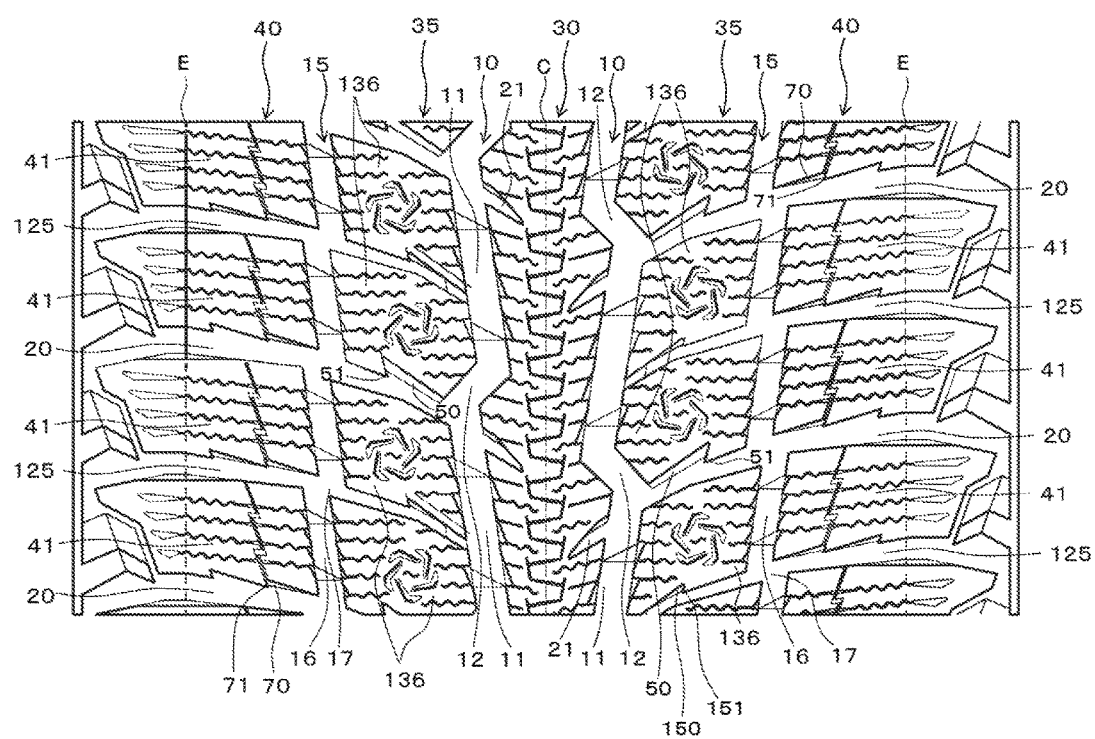
FIG. 5 A tread pattern of the pneumatic tire of a modification.

A modification of a tread pattern is illustrated in FIG. 5. In the tread pattern in FIG. 5, instead of the second lateral grooves 25 closed in the mediate land portion 35 in the tread pattern in FIG. 2, second lateral grooves 125 that traverse the shoulder land portion 40 and the mediate land portion 35 and end in the center main groove 10 while being opened are formed. Therefore, instead of the mediate block 36 which is divided by the first lateral groove 20 and in which the notch 26 is formed in the tread pattern in FIG. 2, a mediate block 136 divided by the first lateral groove 20 and the second lateral groove 125 is provided. Then, in one of step-in side end portions in the mediate block 136 adjacent to the first lateral groove, the notch 50 or the protrusion 51 which are the same as those in FIG. 2 are formed. In a portion adjacent to the second lateral groove 125, a notch 150 or a protrusion 151 similar to the notch 70 or the protrusion 71 are formed.

Even though the notches or the protrusions as described above are formed only in the mediate block 36 (or 136) or the shoulder block 41, the effect may be exerted.

DESCRIPTION OF REFERENCE NUMERALS AND SIGNS

C . . . tire equator, E . . . tire grounding end, 1 . . . pneumatic tire, 2 . . . bead portion, 2a . . . bead core, 2b . . . bead filler, 3 . . . tread rubber, 4 . . . side wall rubber, 5 . . . carcass ply, 6 . . . inner liner, 7 . . . belt, 10 . . . center main groove, 11 . . . first groove portion, 12 . . . second groove portion, 15 . . . shoulder main groove, 16 . . . first groove portion, 17 . . . second groove portion, 20 . . . first lateral groove, 21 . . . notch, 25 . . . second lateral groove, 26 . . . notch, 30 . . . center land portion, 35 . . . mediate land portion, 36 . . . mediate block, 37 . . . step-in side block portion, 38 . . . kick-out side block portion, 40 . . . shoulder land portion, 41 . . . shoulder block, 50 . . . notch, 51 . . . protrusion, 52 . . . bottom surface, 53 . . . shelf portion, 54 . . . boundary, 55 . . . boundary, 60 . . . notch, 61 . . . protrusion, 62 . . . bottom surface, 64 . . . boundary, 65 . . . boundary, 70 . . . notch, 71 . . . protrusion, 72 . . . bottom surface, 73 . . . shelf portion, 74 . . . boundary, 75 . . . boundary, 125 . . . second lateral groove, 136 . . . mediate block, 150 . . . notch, 151 . . . protrusion

The invention claimed is:

1. A pneumatic tire comprising:
   blocks formed by main grooves extending in a circumferential direction of the tire and lateral grooves extending in a tire width direction; and
   notches in step-in side end portions of the blocks,
   wherein the lateral grooves adjacent to the notches extend obliquely such that a tire grounding end side is grounded later,
   wherein portions adjacent to the notches on the tire grounding end side of the notches are protrusions protruding while forming an acute angle toward a tire equator side,
   wherein tips of the protrusions protrude into the lateral grooves beyond the tire grounding end side of the notches,
   wherein bottom surfaces of the notches are higher than bottom portions of the lateral grooves,
   wherein a center land portion having a tire equator, a respective shoulder land portion on each of both sides of the tire in the tire width direction, a respective mediate land portion between the center land portion and the respective shoulder land portion on each of both sides of the tire in the tire width direction are formed, and
   wherein the shoulder land portions and the mediate land portions respectively include respective ones of the blocks each having at least one of the notches and at least one of the protrusions.

2. The pneumatic tire according to claim 1, wherein boundaries between the notches and the protrusions are inclined such that a portion to be grounded later heads toward the tire grounding end side.

3. The pneumatic tire according to claim 1, wherein said bottom surfaces of the notches are higher than bottom portions of the lateral grooves by an amount such that depths of the notches to the bottom surfaces of the notches is 50% or less than depths to bottom portions of the lateral grooves.

4. The pneumatic tire according to claim 1, wherein the tips of the protrusions protrude into the lateral grooves in a manner to improve traction performance in snow due to the tips of the protrusions protruding into the lateral grooves, and wherein the bottom surfaces of the notches are higher than the bottom portions of the lateral grooves in a manner to increase rigidity of the protrusions and improve traction in snow.

5. The pneumatic tire according to claim 1, wherein each of said mediate land portions has one of the notches and one of the protrusions, and each of said shoulder land portions has two of the notches and two of the protrusions.

6. The pneumatic tire according to claim 1, wherein at least some of the blocks are sandwiched by two of the main grooves, each of the two main grooves having a zigzag shape.

\* \* \* \* \*